US012794710B2

(12) United States Patent
King

(10) Patent No.: US 12,794,710 B2
(45) Date of Patent: Nov. 10, 2026

(54) SECURE ACCESS CONTROL

(71) Applicant: Glue AB, Stockholm (SE)

(72) Inventor: Edward King, London (GB)

(73) Assignee: Glue AB, Stockholm (SE)

( * ) Notice: Subject to any disclaimer, the term of this patent is extended or adjusted under 35 U.S.C. 154(b) by 59 days.

(21) Appl. No.: 19/107,248

(22) PCT Filed: Jul. 11, 2023

(86) PCT No.: PCT/EP2023/069173

§ 371 (c)(1),
(2) Date: Feb. 27, 2025

(87) PCT Pub. No.: WO2024/046636

PCT Pub. Date: Mar. 7, 2024

(65) Prior Publication Data

US 2026/0081788 A1 Mar. 19, 2026

(30) Foreign Application Priority Data

Aug. 31, 2022 (GB) ..................................... 2212661

(51) Int. Cl.
*G06F 21/31* (2013.01)
*H04L 9/32* (2006.01)

(52) U.S. Cl.
CPC .......... *H04L 9/3247* (2013.01); *H04L 9/3213* (2013.01)

(58) Field of Classification Search
CPC ........ G06F 21/31; G06F 21/33; G06F 21/445; G06F 21/45; G06F 21/55; G06F 2221/2129
See application file for complete search history.

(56) References Cited

U.S. PATENT DOCUMENTS

2011/0179478 A1* 7/2011 Flick .................... H04L 9/0822 726/9
2011/0265159 A1* 10/2011 Ronda ................. H04L 63/0853 726/9

(Continued)

FOREIGN PATENT DOCUMENTS

EP 2573720 A1 3/2013
EP 3676134 B1 10/2021

(Continued)

OTHER PUBLICATIONS

International Search Report and Written Opinion of the International Searching Authority dated Oct. 20, 2023 for corresponding International Application No. PCT/EP2023/069173, filed Jul. 11, 2023.

(Continued)

*Primary Examiner* — Quazi Farooqui
(74) *Attorney, Agent, or Firm* — David D. Brush; Westman, Champlin & Koehler, P.A.

(57) ABSTRACT

System and method for delivering a secure message to a device. The method includes: digitally signing a first message using a private key of a first entity; encrypting the digitally signed first message using a public key of the device to form a token; further encrypting the token using a public key of a second entity; transmitting the further encrypted token to the second entity; the second entity decrypting the further encrypted token using a corresponding private key of the second entity to recover the token; the second entity delivering the token to the device; the device decrypting the token to recover the digitally signed first message using a corresponding private key of the device; and the device authenticating the digitally signed first message using a corresponding public key of the first entity.

20 Claims, 13 Drawing Sheets

(56) References Cited

U.S. PATENT DOCUMENTS

| | | | |
|---|---|---|---|
| 2016/0180618 A1 | 6/2016 | Ho et al. |
| 2018/0248704 A1 | 8/2018 | Coode et al. |
| 2022/0028194 A1 | 1/2022 | Grzenda et al. |

FOREIGN PATENT DOCUMENTS

| | | |
|---|---|---|
| WO | 2017046399 A1 | 3/2017 |
| WO | 2019134868 A1 | 7/2019 |

OTHER PUBLICATIONS

Written Opinion of the International Searching Authority dated Oct. 20, 2023 for corresponding International Application No. PCT/EP2023/069173, filed Jul. 11, 2023.

Great Britain Search Report dated Feb. 28, 2023, for corresponding Great Britain Application No. 2212661.9, filed Aug. 31, 2022.

* cited by examiner

SECURE ACCESS CONTROL

CROSS-REFERENCE TO RELATED APPLICATIONS

This Application is a Section 371 National Stage Application of International Application No. PCT/EP2023/069173, filed Jul. 11, 2023, and published as WO 2024/046636 A1 on Mar. 7, 2024, in English, which claims priority to and the benefit of French Patent Application No. 2212661.9, filed Aug. 31, 2022, the contents of which are incorporated herein by reference in their entireties.

FIELD OF THE INVENTION

The present invention relates to a system and method for securely delivering messages to devices such as electronic locks, and in particular to delivering messages causing the lock to activate (unlock or lock) without requiring the presence of a trusted user.

BACKGROUND OF THE INVENTION

Existing electronic locks protect locations but can allow access to particular approved users or guests. Such electronic locks may be operated using a mobile application operating on a local device (e.g., within Bluetooth wireless range) or by manual physical interactions (e.g., thumbturn).

When the lock is operated electronically then the mobile application can connect wirelessly (e.g., via Bluetooth low energy-BLE) to the lock and send messages or commands to cause particular operations within the electronic lock. Alternatively, if the device on which the mobile application is operating, is not within local Bluetooth range of the lock then remote operation of the lock may be used. In this case, a local device such as a hub that remains permanently within local communication range of the lock, can interact through the internet with a remote server that passes on messages between the mobile application and the lock via the hub.

As the lock provides access to a physical location then any messages must be appropriately secured. Therefore, the lock contains software or firmware that authenticates any received message (local or remote). In order to do so, the lock may register one or more authenticated users within local memory. Various cryptographic processes may be used to ensure that the received messages originate from an authorised user, that the messages have not been tampered with, and that the messages cannot be intercepted or read by any third party without permission. This security and authentication may require a secure exchange of keys between the lock and a trusted server and/or any authorised users. Such transfers of keys increase security risks, requires additional system resources and can be cumbersome.

Authenticating users with the lock may involve manual processes to set up each individual user (e.g., within a family). If the members of a family or occupants of a location are static or rarely change then such manual processes may be acceptable. However, such processes may become a burden if temporary users need to be authenticated, enabled and then disabled relatively often. This can be the case when delivery drivers require temporary access to a location in order to deposit parcels, for example.

There may be storage space limitations for the lock, which typically has limited processing capabilities and constrained storage space. Temporarily adding new authorised users to the device can cause the device to become full. If an access list of authorised users needs to be updated regularly, then this requires the lock to be in constant communication with the hub to ensure that it remains online and in communication with a trusted server in order to receive regular updates. If such network connectivity becomes unreliable then the list of authorised users can become desynchronised or out of date, leading to difficulties for authorised users to access the location via the lock. Users that should be removed from the access list may also remain active for too long leading to security risks.

Such access control requires the distribution of further keys. Such keys may expire after periods of time or after a single use. Therefore, without an active network connection, these keys can also become desynchronised, or a set of keys can become exhausted if they are used before they can be replenished by an authorised user or their mobile application. Again, this can cause access problems and refusals to accept a valid command from an authorised user.

Therefore, there is required a method and system that overcomes these problems.

SUMMARY OF THE INVENTION

A device generates its own private and public key pair. The device, which may be an electronic lock (but other devices such as hubs, may be used), also contains a storage medium and a communications interface (e.g., a local wireless interface). The electronic lock may have its own power supply (e.g., a primary or secondary battery). A user (or a user's device, such as a mobile device) is registered with the device. Registration typically involves storing a public key of the registered user within the storage of the device. Registration also enables the registered (or trusted) user (or any entity) to send instructions the device, which in the case of an electronic lock, may be an instruction to unlock, lock, registering new users and/or removing existing users, for example. Other messages may be used, including but not limited to requesting a status of the device, updating firmware, changing settings, etc.

When temporary or one-time access to the device is required, then a new user may be registered and then removed or invalidated once their access is no longer required. However, this may require a direct connection between an existing or permanent registered user and the device to temporarily register the new user. Instead of this, the existing registered user can generate a message to be ultimately received by the device (e.g., in the case of an electronic lock, the command maybe an unlocking command). The registered user digitally signs the message in a way that it may be authenticated using the public key of the registered user (i.e., stored within the memory of the device). This process may use a signing keypair of the registered user. The message is also encrypted using the public key of the device (i.e., part of an encryption key pair). During registration of the user, the digital lock may provide its own public key or keys to the registered user (i.e., parts of an encryption key pair and a signing key pair).

This digitally signed and encrypted message may be combined with details of the device and then further encrypted using a public key of another entity (e.g., a user unregistered with the device or a second entity). This forms a package, token or other digital object for the device, which is transmitted to the unregistered user who can use their own stored private key to carry out a decryption process on the token. This can ensure further security and integrity of the message because it is limited to be used only by the second entity.

The second entity (unregistered user) acts as an intermediary between the registered user and the device. The second entity transmits the delivery package to the device (after the "outer" encryption has been removed by the second entity). The device decrypts the message (e.g., an unlock command) using its own stored private key. The device also authenticates the message using the stored public key of the registered user. Therefore, the device can be sure that the message originated form an authorised (registered) user even though it was delivered by a third party who was not and did not need to be registered with the device.

The message may comprise a direct unlock command, which may be executed by the device (i.e., an electronic lock). Alternatively, the message may comprise an instruction to temporarily register the second user so that they can issue their own unlocking command, which will be accepted by the device. Other message types may be used. Therefore, messages can be delivered securely without requiring any authorised or registered user to be directly involved or present. This can be especially advantageous when the other or unregistered user delivers the token locally (e.g., using a local wireless interface).

As a further enhancement, the registered user (or another entity) may add or embed a further message into the token before it is further encrypted. This further message may be readable by the other or unregistered user when they decrypt the token (but they cannot decrypt the first or original message). Therefore, the further message may be used as part of the process for delivering the original message to the device. For example, the further message may contain location information enabling the other user to travel to the physical location of the device. This may be coordinates (e.g., GPS) or an address, for example.

Against this Background and in Accordance with a First Aspect there is Provided a Method for Delivering a Secure Message to a Device, the Method Comprising the Steps of:

- generating a first message to deliver to the device (which may be an electronic lock);
- digitally signing the first message using a private (e.g., signing) key of a first entity, wherein the private key has a corresponding public key;
- encrypting the digitally signed first message using a public (e.g., encryption) key of the device to form a token, wherein the public key of the device has a corresponding private key;
- further encrypting the token using a public key of a second entity, wherein the public key of the second entity has a corresponding private key;
- transmitting the further encrypted token to the second entity;
- the second entity decrypting the further encrypted token using the private key of the second entity to recover the token;
- the second entity delivering the token to the device;
- the device decrypting the token to recover the digitally signed first message using the private key of the device; and
- the device authenticating the digitally signed first message using the public key of the first entity. The token may be a delivery token or may take the form of an encrypted command. Furthermore, when the token is further encrypted, this may take the form of wrapping the token in further encryption so that the resultant data object may be decrypted in stages or layers. Digitally signing the first message may take different forms. For example, the public and private key pair of the first entity may be specific signing keys. A digital signature may be derived from the first message and the private key using a hashing process, for example. The digital signature may then accompany or form part of the first message. The first entity may be the device of a user (e.g., a smartphone or tablet) that is already authorised. The second entity may be the device of another user, that is not authorised or registered. Therefore, the method may be used to pass messages securely using an unauthorised intermediary without compromising security. In some example implementations the first message may contain information that enables the device to carry out a particular action. This particular action may be commanded by a computer (e.g., mobile device) under the control of the second entity but may only be carried out if accompanied by a first message having particular contents or attributes. The first message may be used for other purposes.

Advantageously, the method may further comprise the steps of:

- generating a second message; and
- embedding (e.g., combining or adding) the encrypted digitally signed first message (token) into the second message to form a data object which may be preferably signed with the private (signing) key of the first entity,
- wherein the step of further encrypting the token using the public key of the second entity may further comprise signing the data object (token and second message) with the private (signing) key of the first entity and then encrypting the resultant signed data object using the public (encryption) key of the second entity to form an encrypted signed data object (including the token),
- wherein the step of the second entity decrypting the encrypted token may further comprise the second entity decrypting the encrypted signed data object using the private (encryption) key of the second entity to recover the signed data object (second message and token); and
- the second entity authenticating the signed data object using the public (signing) key of the first entity, wherein the second entity delivers the token to the device (if the authentication of the signed data object was successful) using information contained within the second message. In the case of only a first message being generated, the digitally signed first message is encrypted to form the token. The first message is directed to the device only and cannot be read by the second entity. When a second message is required (i.e., a message that is to be available and understood by the second entity) then the encrypted and digitally signed first message (token) is further processed by embedding the token into the second message. The result of this process (a data object) is encrypted (using the public encryption key of the second entity) to form an encrypted data object. Embedding the encrypted digitally signed first message into the second message may be a form of wrapping. Therefore, the second entity is able to partially unwrap and have access to some of the information within the encrypted data object (i.e., the second message) but not have access (be able to decrypt) the first message, which remains part of the token containing the first message (which can only be decrypted by the device). This allows some information to be imparted to the second entity or other user's device (which is not authorised with the device) enabling them to complete the task of delivering the first message to the device without having access to the contents of the first message. The first message may take the form of a command or command identifier, for example. When the second entity decrypts the encrypted data object, this provides the second entity with the signed data object. The second message was embedded into or otherwise added to the token. Therefore, at this stage, the second message becomes available (readable) to the second entity. The second message may be embedded into the token, or the token may be embedded into the second message or otherwise combined.

Optionally, the information contained within the second message may be data locating or identifying the device. This can be an address, postal code, GPS coordinates, a location identifier, a serial number, or other information, for example.

Optionally, the method may further comprise the step of digitally signing the second message using a private key of a trusted entity before adding the second message to the encrypted digitally signed first message to form the token, wherein the second entity authenticates the digital signature used to digitally sign the second message using the public key of the trusted entity. Therefore, additional security and control of authorisations may be maintained.

Optionally, the trusted entity may be the first entity, an entity with the same authorisation permissions as the first entity, or an external server or platform. For example, the trusted entity may be a platform that manages the system in which the method operates.

Preferably, the second entity may deliver the encrypted digitally signed first message to the device using a local wireless communication protocol. Therefore, the second entity (not an authorised entity) can safely deliver a message or command to the device locally when the first entity (authorised) is not present.

Optionally, the local wireless communication protocol may be Bluetooth Low Energy (BLE), Thread, Zigbee, or near field communication, NFC. Other communication protocols may be used.

Optionally, the device may receive and store the public (signing) key of the first entity before receiving the encrypted digitally signed first message. This may be done just before or preferably in advance and as part of a separate transaction, for example.

Optionally, the first message may contain an instruction for the device to operate, unlock, or lock. The first message may be any message, command, instruction, update, or information, for example.

Preferably, the method may further comprise the step of the device unlocking or locking in response to the first message. In this case, the device may be an electronic lock or attached to or in wired communication with an electronic lock.

Optionally, each first message may be uniquely identifiable and the device may require receiving a first message that has not been previously used to unlock the device, before executing each unlocking (or other sensitive) action. This is to prevent replay of the same message to repeat an action (e.g., unlocking). This further improves security. The first message may be uniquely identifiable by having a different digital signature generated each time (e.g., generated using different signing keys of the first entity, timestamps or random numbers).

Optionally, the instruction to the device to unlock may have an expiry time and/or a validity time window (start and end time).

Optionally, the first message may contain an instruction to:

- register a new entity within memory storage within the device;
- remove a stored entity from the memory storage within the device; and/or
- temporarily register a new entity within the device for a limited time period. Temporarily registering the new entity may avoid the need to store credentials of the new entity in non-volatile memory. Instead, the registration details may be stored in volatile memory as it only needs to be valid very briefly or even for a single operation or command (i.e., contained within the first message). The first message may contain more than one instruction or command.

Optionally, registering a new entity may comprise sharing between the new entity and the device public keys of the new entity and the device. Other methods may be used.

Preferably, the device may be an electronic lock. Other device types may be used.

Optionally, in response to a request issued by a third entity transmitted to the first entity, the first entity may carry out the steps (i.e., those steps defined above) of:

- generating the first message to deliver to the device;
- digitally signing the first message using the private key of the first entity;
- encrypting the digitally signed first message using the public key of the device to form the token; and
- transmitting the token to the third entity, and
- wherein the third entity may carry out the step of further encrypting the token using the public key of a second entity. The third entity may be a server or platform used to manage a plurality of devices and/or administer second entities (e.g., delivery couriers and their mobile devices). Therefore, the third entity may initiate the generation of the first message so that it may be processed and sent to the second entity and used to carry out one or more tasks on behalf of the first entity but without requiring the first entity to interact directly with the device. The third entity may issue the request after receiving another request from a different party (e.g., a supervising entity of the second entity). For example, the supervising entity may use an application programming interface to initiate the request to improve interoperability with the third entity Preferably, the further encrypted token may be transmitted to the second entity by the third entity. Therefore, the third entity (e.g., platform) can request the generation of the first message from the first entity (e.g., owner of the device), receive the generated first message and pass it on to the second entity (e.g., delivery courier) as part of a set of one or more first messages for the same or different devices.

Optionally, the method may further comprise the step of the second entity transmitting to the third entity an indication that the token has been delivered to the device. Therefore, the third entity can keep track of how and when the token (and ultimately the first message) has been delivered and used.

Preferably, the method may further comprise the step of the third entity deleting the token in response to receiving the indication that the token has been delivered to the device. Therefore, security can be improved as the first message (that can enable one or more actions or tasks to be carried out by the device) is deleted as soon as possible after delivery or use.

Preferably, the step of the second entity delivering the token to the device may further comprise the step of the second entity issuing an instruction to the device to use the first message to execute a command, wherein the command is executed by the device following the step of the device authenticating the digitally signed first message. The command may only be executed with a valid first message. The first message may be issued in advance (e.g., from the third entity) so that the second entity can have limited access or control of the device (e.g., a smart lock). Authenticating the first message may include cryptographic authentication (e.g., decrypting the token to recover the digitally signed first message and then checking the signature) and/or determining whether conditions are met relating to information contained within the first message (e.g., validity time periods, etc.) Therefore, the second entity (e.g., a mobile device of a delivery courier) can create their own commands using the first message as an authentication token or blob.

Optionally, the request issued by the third entity to the first entity may include data describing a validity time period for the first message, wherein the validity time period is included in the first message and further wherein device executes the command if the current time is within the validity time period included in the first message. This enables the device to determine if the command issued by the second entity should be executed (i.e., only if conditions are met).

Preferably, the device may execute the command after determining that the first message has not been previously used to execute a command. The device may keep track of previous first messages that have already been used. This restricts the second entity from repeatedly using the first message (e.g., to open an electronic lock a second or further time). For example, the first message may contain a unique identifier (e.g., a nonce) generated by the first or third entities.

Optionally, the request (e.g., sent by the second entity to the device) may include a session identifier, wherein the session identifier is included in the first message, wherein the step of the second entity delivering the token to the device further includes the step of the second entity issuing an instruction to the device to start a session corresponding to the session identifier included in the first message, and wherein the method may further comprise the step of the second entity issuing an instruction to the device to end the session after the command has been executed. Therefore, the command or commands (e.g., to lock or unlock an electronic lock) may only be executed during an active session (i.e., between the start of the session and the end of the session).

Preferably, the method may further comprise the step of the device executing the command after determining that the session identifier has not been used before and/or the session has not ended. This provides a further mechanism for ensuring that the first message is only used once and that it can only be used whilst particular conditions are met (i.e., within a particular session). The device may maintain a list of used session identifiers or can query a database (e.g., external) for used session identifiers.

Optionally, the method may further comprise the step of the second entity (e.g., delivery courier using a mobile device) transmitting a confirmation after the session (as determined by the session identifier) has ended.

Preferably, the method may further comprise the steps of:

the third entity instructing the second entity to delete the token in response to receiving the confirmation that the session has ended; and the second entity deleting the token in response. This further improves security as material generated by an owner of a device (first entity) enabling another party to use it (second entity) is deleted as soon as possible.

In accordance with a second aspect there is provide a system comprising:

a device;

a second entity;

a first entity having means adapted to execute the steps of:

generating a first message to deliver to the device, digitally signing the first message using a private (signing) key of the first entity, wherein the private key has a corresponding public key, encrypting the digitally signed first message using a public (encryption) key of the device, wherein the public key of the device has a corresponding private key to form a token, encrypting the token using a public key of the second entity, wherein the public key of the second entity has a corresponding private key, and transmitting the token to the second entity, wherein the second entity has means adapted to execute the steps of:

decrypting the token using the private key of the second entity;

delivering the encrypted digitally signed first message to the device, and further wherein the device has means adapted to execute the steps of:

decrypting the first message using the private key of the device, and the device authenticating the first message using the public key of the first entity.

Preferably, the system may further comprise a server and/or platform having means adapted to execute the steps of:

receiving from the first entity a request to register the second entity, the request comprising identification information of the second entity;

digitally signing the identification information of the second entity;

encrypting the digitally signed identification information using the public key of the first entity;

transmitting the digitally signed and encrypted identification information to the first entity; and receiving a response confirming the registration of the second entity. The server or platform may take different forms. For example, it may be a physical server a virtual (e.g., cloud) server, or a collection of separate machines. The different entities may be devices of users and registration may be limited to a particular device (e.g., a smartphone or smartwatch) or a group of devices. Furthermore, the first entity may use the first message to register a second entity belonging to the same user or person or register a device under the control of or belonging to another person. The first entity may or may not be present or at the location of the device during the procedure.

Optionally, the response may be received from the device, from the first entity, and/or from the second entity. This may be over a wide area network, such as the internet. The response may be encrypted for any entity if a public (encryption) key is provided for the response within the corresponding message.

Optionally, the means of the first entity may be further adapted to execute the steps of:

generating a second message; and embedding (e.g., combining or adding) the encrypted digitally signed first message (token) into the second message to form a data object which may be preferably signed with the private (signing) key of the first entity, wherein the step of further encrypting the token using the public (encryption) key of the second entity may further comprise signing the data object (token and second message) with the private (signing) key of the first entity and then encrypting the resultant signed data object using the public (encryption) key of the second entity to form an encrypted data object (including the token), wherein the second entity decrypts the encrypted signed data object using the private (encryption) key of the second entity to extract or recover the signed data object (second message and token), and further wherein the second entity has means further adapted to execute the steps of:

authenticating the signed data object using the public (signing) key of the first entity, wherein the second entity delivers the token to the device (if the authentication of the signed data object was successful) using information contained within the second message. When the second entity decrypts the encrypted data object, this provides the second entity with the signed data object. The second message was embedded or added to the token. Therefore, at this stage, the second message becomes available (readable) to the second entity.

Optionally, the information contained within the second message may be data locating the device.

Optionally, the means of the server may be further adapted to execute the steps of: digitally signing the second message using a private key of the server before the second message is added to the encrypted digitally signed first message to form the token, wherein the second entity authenticates the digital signature used to digitally sign the second message using the public key of the server. The server or platform may require pre-authorisation from a user (e.g., the first entity) before carrying out these steps. The device (e.g., a lock) may recognise the authority of the server in this way but the server may only act on behalf of this specific first entity when instructed to do so. There may be many first entities within the system and a single server (or one of several servers) may provide this service to many first entities, for example.

Preferably, the device may be an electronic lock.

In accordance with a third aspect, there is provided a device comprising:

a local wireless communication interface;

memory (e.g., non-volatile memory) storing a public key and a corresponding private key of the device, and a public key of a first entity; and means adapted to execute the steps of:

receiving from a second entity over the local wireless communication interface an encrypted token containing a first message, wherein the first message contains an instruction;

decrypting the first message using the stored private key of the device;

authenticating the first message using the public key of the first entity; and following successful authentication, carrying out the instruction.

Preferably, the device may be an electronic lock and further wherein the instruction may comprise an unlocking instruction and carrying out the instruction unlocks the electronic lock.

Optionally, the instruction may comprise:

registering a new entity within memory of the device;

removing a stored entity from the memory within the device; and/or temporarily registering a new entity within memory within the device for a limited time period.

The methods described above may be implemented as a computer program comprising program instructions to operate a computer. The computer program may be stored on a computer-readable medium.

The computer system may include a processor or processors (e.g., local, virtual or cloud-based) such as a Central Processing Unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
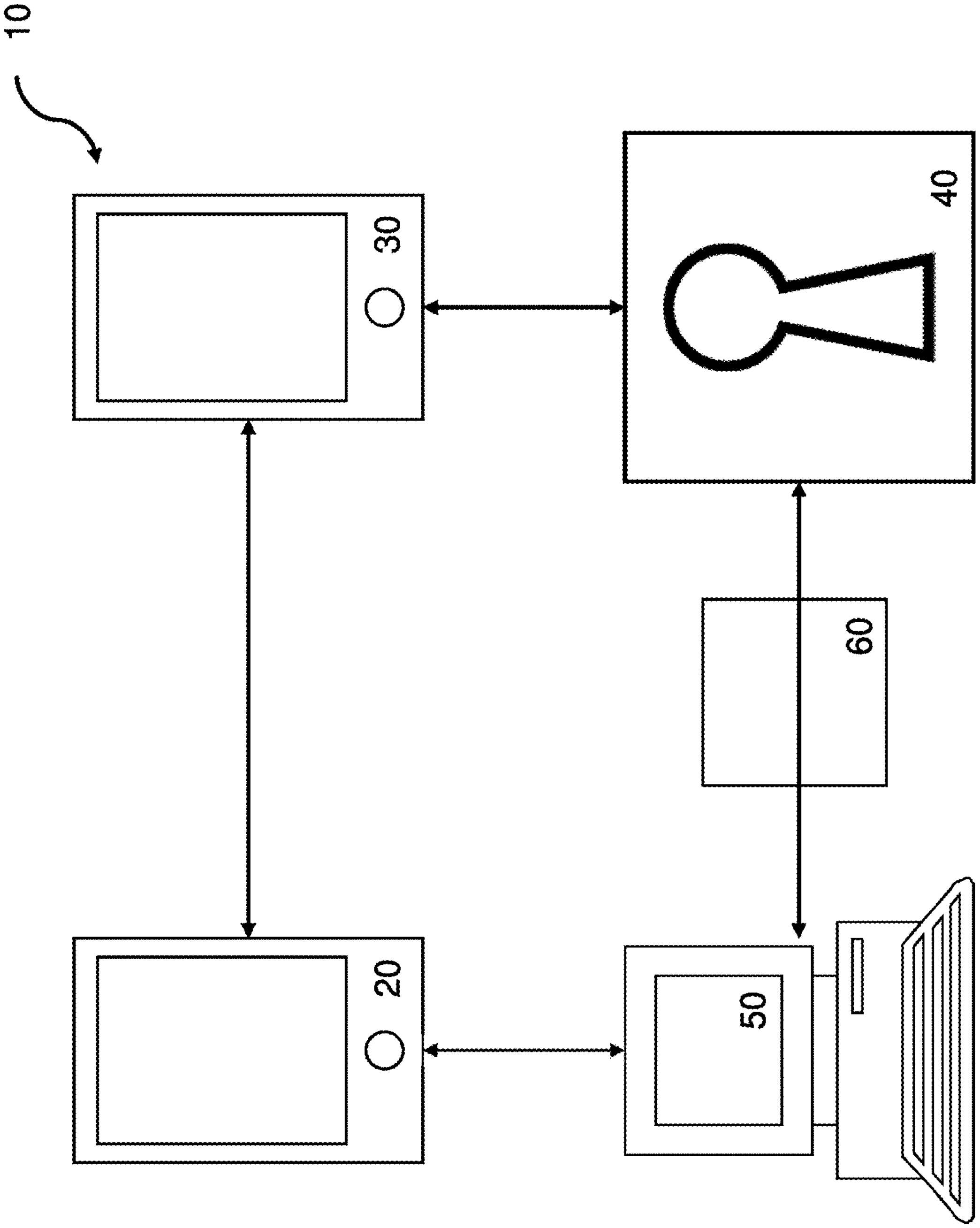
FIG. 1 shows a schematic diagram of a system for securely delivering messages to a device.

Electronic locks, such as devices produced by Glue AB, may lock and latch and can be operated (unlocked or locked) both digitally via a mobile application or app (e.g., Glue app) installed or a mobile device (e.g., a smartphone) or by manual user input using a thumbturn.

When the device is operated digitally, the app either connects wirelessly via Bluetooth Low Energy (BLE) of the mobile (or other) device and sends the necessary commands formatted according to a protocol understood by the device, to perform an operation. Alternatively, the mobile app can instruct a platform over the internet to connect via BLE through a local hub (e.g., router) device to pass on the instruction. The hub may be a bridge between the device and a modem or router either wired or wireless (e.g., ethernet or WiFi). The decision of whether the device receives the command directly by the app on the mobile device or from the hub, is based on the mobile device's proximity to the device at the time of the command being sent. If the mobile device is within BLE range of the device, then it will connect over BLE (a local operation). If not, then the hub may be used (a remote operation).

In both cases, and once a BLE or other connection to the device has been established (from the mobile device or from the hub), protocol commands are sent to operate it. Responses to these commands are returned, containing the result of the command and any relevant extra data, e.g., status information.

The protocol is a collection of message structures that describe the format of data that can be sent between devices in the platform or electronic locks. Therefore, as long as a device (in whatever form) understands and adheres to the protocol, then it can communicate across the mobile applications and the rest of the platform (e.g., external servers). Security models are used to secure these communications and commands. The security models have the function of securing messages and facilitating trust between devices (e.g., hubs, electronic locks, and/or mobile devices). Existing security models may use symmetric key cryptography.

An enhanced security model provides secure communications with the electronic locks or other devices in the system but allows access to temporary users without compromising security or increasing complexity.

In an existing security model, the devices (e.g., electronic locks) can only be operated by an authenticated user, who has associated metadata to identify them. This metadata is used by the platform to securely create a key, which is then used to 'log in' to the device. Once the key has been used to log in (via a protocol command sent to the device over BLE), the connection is deemed to be 'authenticated', and thereafter sensitive commands may be processed, e.g., to start an operation. In order for the device to approve the login attempt, the user's metadata must already be known to it. This is achieved by sending an access list to the device containing the metadata (e.g., cryptographic keys) for all authenticated users. This must be done prior to any attempt to login. A similar process is used for temporary or guest users, such as delivery drivers. These temporary users are added as a guest user in the access list, which again must be sent to the device prior to the delivery taking place.

Every time a new user is added or removed from the device, a new access list needs to be created and sent to the device. The access list may be relatively large in terms of storage space available for a device and so there may be a maximum number of users that can be added to a device due to protocol messaging limits (e.g., 10 users). Where delivery drivers are added to an access list on a regular basis (e.g., to fulfil deliveries), then the device can soon become full.

The access list may be sent to the device using the hub, which itself has an internet connection. However, the hub may not be present, may be faulty or may not be able to access the internet. In this case, the access list can be provided to the device using the mobile app. However, such connections to a mobile app on a local device (e.g., via BLE) can be intermittent and so it is possible for the access list to become desynchronised across devices, which can lead to problems in operating the device.

The platform owns and distributes the keys using the security model. For authorised users to have offline access to their device (e.g., electronic lock), then it is necessary for the platform to send a set of pre-generated keys to each user's or device's mobile app that can then be used to login to the device without an internet connection. Once these keys are exhausted (especially if they are time or use limited), then the user's app must get a further set of keys from the platform. Therefore, permanent offline access is not possible without regular refreshing of a key list. Furthermore, if a user operates their device from multiple mobile devices, then the offline keys can easily become desynchronised, affecting the user experience and in some cases causing problems in operating the device.

The new security model (NSM) solves these problems and provide additional advantages. The NSM (forming at least part of present improved system) makes use of public-key (asymmetric key) cryptography and digital signatures to securely provide messages to electronic locks and other devices. These messages can include access commands (e.g., lock and unlock) as well as configuration commands (e.g., grant temporary or permanent access to a new user, suspend, or remove access for registered users, and/or change access privileges for existing registered users). In a particular example implementation, a cross-platform, multi-language library (e.g., Libsodium) is used to implement the NSM. This library includes the concept of sealed boxes (Curve25519) for encryption and public-key signatures (Ed25519) for digital signing. Other libraries and languages may be used.

FIG. 1 shows a schematic diagram of a system 10 showing a mobile device of a registered user 20, a mobile device of an unregistered user 30, a device (e.g., electronic lock) 40 and a platform server 50. The arrows of FIG. 1 show various communication channels between the entities. These communications channels may be over the internet, they may be local, and/or they may be wired or wireless, for example. In this example, the lock 40 communicates with the platform server 50 through a local hub 60, that is connected to the internet using a router (not shown in this Figure). There may be many more user devices, locks 40 and hubs 60 that connect with one or more platform servers 50, for example.

For an entity, e.g., user, server, or device, (Alice in the following examples) to send a message securely to another user (Bob in these examples) and for Bob to be able to both read the message and know that it came from Alice, then both Alice and Bob need two sets of keys—encryption keys and signing keys. Table 1 provides example keys in an example format (e.g., GP3). The keys will be different for each user and generated using a suitable key generation algorithm.

TABLE 1

| | | |
|---|---|---|
| EncryptionKeys | EncryptionPublicKey | 1AA95C676F621FCC1856076BDDA190D92<br>73D50463646D8CEE7339B8400431F26 |
| | EncryptionPrivateKey | A2D19D275F8CD9275E636E69F13684FC4<br>7D70065E3717A473C1C756465D11C11 |

TABLE 1-continued

| | | |
|---|---|---|
| SigningKeys | SigningPublicKey | 98FF6EF7A5008CD64CCD744EC8A278874<br>0513537DAD10234A57721376E6107B2 |
| | SigningPrivateKey | ABA40A3B26AD211037C98BEA836376237<br>FEFFF83F2FFA07322628B255DE2B1FF |

Prior to sending a message, both Alice and Bob need to have shared their public keys with each other. Assuming this has already happened, the procedure for sending the secure message (using GP3 definitions) is shown in the sequence diagram of FIG. 2.

Figure 2:
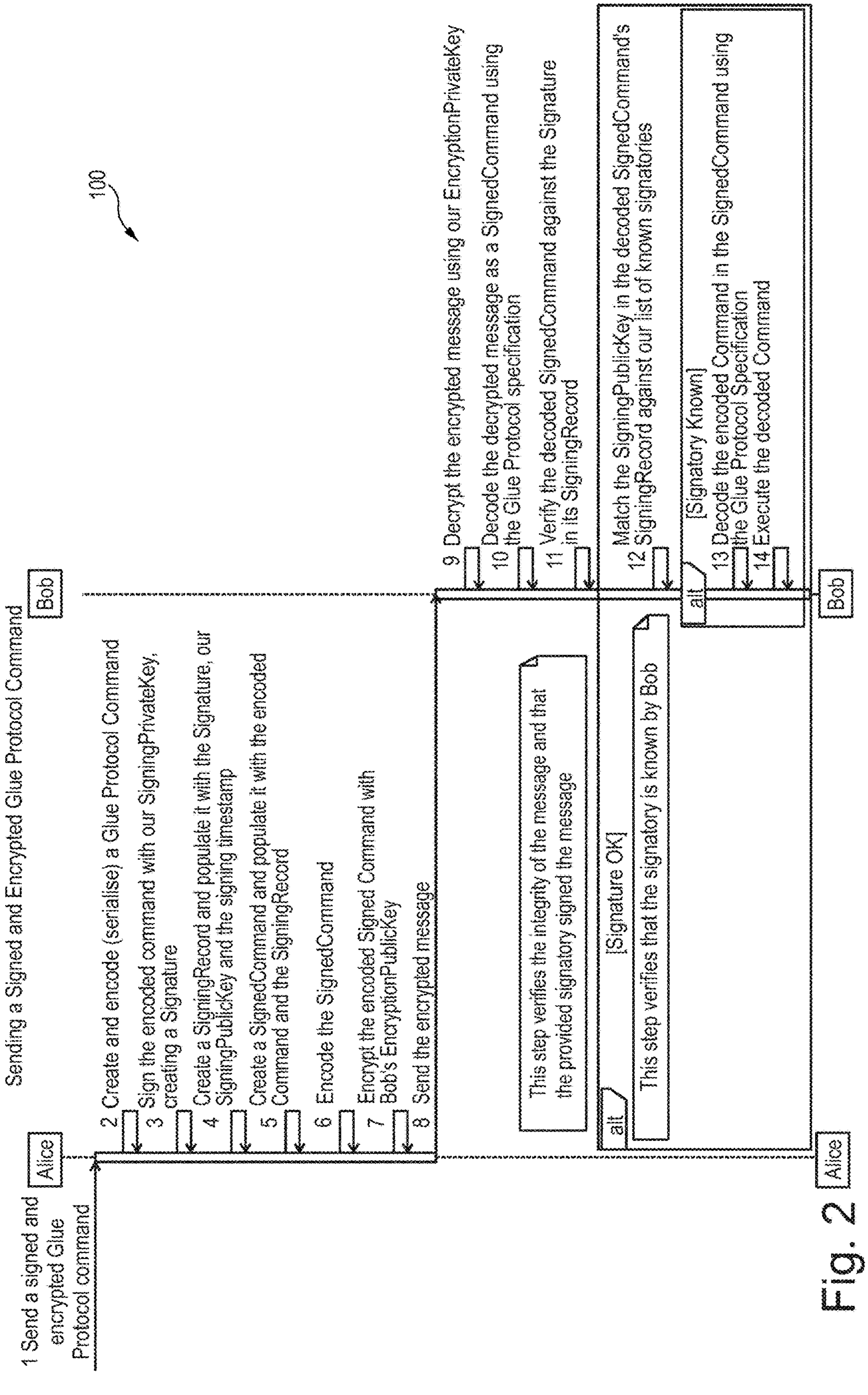
FIG. 2 shows a sequence diagram of a method for securely delivering messages to the device of FIG. 1.

FIG. 2 shows a sequence diagram illustrating a method 100 for generating a command (message) to be sent between Alice and Bob using the Glue Protocol (GP3). FIG. 2 shows a simplified set of steps only involving two entities. However, this can help to understand a more complex sequence under the NSM illustrated in FIGS. 3A-3C.

After Bob has actioned the received a command, then Bob will want to reply to Alice. If a secure reply is required, then Bob can follow the same procedure as above shown in FIG. 2 but instead using a Response and a corresponding SignedResponse. To summarise from a cryptographic point-of-view, in order to send a secure message, the sender signs the message with their private signing key and encrypts it with the recipient's public encryption key. The recipient then decrypts the message with their private encryption key and verifies the message using the provided signature and public signing key sent with the message.

To summarise the method 100 shown in FIG. 2, Alice (e.g., the mobile application of a registered user) creates a command, signs the command using their own private key, encrypts the command using Bob's public key and sends the encrypted signed command (message) to Bob. Bob decrypts the received information using their own private key, verifies or authenticates the signature using Alice's public key and executes the command if this is successful. Other steps include decoding processes used to interpret the command.

Adding a device owner involves an initial setup procedure. When a device arrives fresh from a factory, it may have no keys and no authorised users. This avoids the need to generate private information away from end users and to keep public information shared only with those who need it. When a device is first turned on, it generates its encryption and signing key-pairs. At this point it may operate but is ownerless and so cannot be operated. Ultimately, a device has to trust someone, some entity, or a user before it can be used. This first entity may be defined as a first user or device that issues a USER_SHARE_KEYS command to the device. This condition may be obtained by conducting a factory reset on the device. For a device that has been factory reset in this way (i.e., a device with no users), this command has the effect of adding the command-issuer as the one and only owner of that device. After this point, the USER_SHARE_KEYS command has no effect on a device. New, additional or trusted users (i.e., additional first or primary entities) can only be added by a trusted or existing user via a USER_ADD command.

The system and method may be used to manage and operate a device such as a smart lock (e.g., locking and unlocking). A suitable smart lock is described in WO2017/046399 although other locks and devices may be used.

In an example, implementation, once a smart lock or device 40 has an owner (as described above), only one message is required to either unlock or lock the device 40. Unlike earlier systems, the device 40 may have the final say over whether an operation is authorised. For example, if a DEVICE_UNLOCK message is received and processed, the device 40 verifies that the issuing user has permissions to operate the device 40 at that particular time. In order to authenticate a user 20, the user 20 must have been previously added to the device (e.g., smart lock) 40. Therefore, the device 40 should have already stored locally the user's 20 SigningPublicKey. Then, when that user 20 tries to operate the device 40 by sending it a SignedCommand, then the device 40 can verify that the key in an accompanying Signing Record matches the key that it has stored. This confirms that the user 20 associated with the key has permissions to operate the device 40 at that time. This process occurs even if the command (i.e., message) was received via a third party user 30, for which the device 40 does not have or does not need to have a stored signing public key.

For a new user to be added to the device 40, then they may be invited by an existing user 20. The existing user 20 is one who already has access to the device 40 (i.e., the device 40 has a stored signing public key for this existing user 20). Preferably, the device 40 may only accept commands signed by existing users 20, so the actual invite must be signed by an existing user 20 as well. The described methods enable a concept of messaging, which is similar to proxy messages or providing a "power-of-attorney" process. This allows an untrusted user 30 (or device) to issue a message or command to another device 40 on behalf of a trusted user 20. The device 40 may accept the message or command as long as it has been signed by the trusted user 20.

The following provides an illustrative example for such invitations. For example, if Alice (a trusted user 20) wants to invite Bob (an untrusted user 30) to use Lockie (a device 40), then Alice can create a USER_ADD command (the invite) on behalf of Bob, such that when Bob walks up to Lockie and issues the message or command (e.g., over BLE), then the message or command is accepted because it is signed by the trusted user, Alice. In order for Bob to know what to do with the invite (since it may be an encrypted/opaque blob or data object) then it may be wrapped in a DEVICE_PROXY command, which contains the target device information or information enabling the delivery of the message or command.

The described method and system 10 enables any user or device, trusted or not, to deliver Bob's invite. In this scenario, it just happens to be Bob himself, but other entities may be such users in the delivery mechanism. Furthermore, there does not need to be a requirement to RSVP or provide a response to an invite (although this may be carried out). The invited user 30 can immediately attempt to operate the device 40 that they have been invited to or this can happen at a later time. This process 200 is shown within the sequence diagram of FIGS. 3A-3C.

Figure 3A:
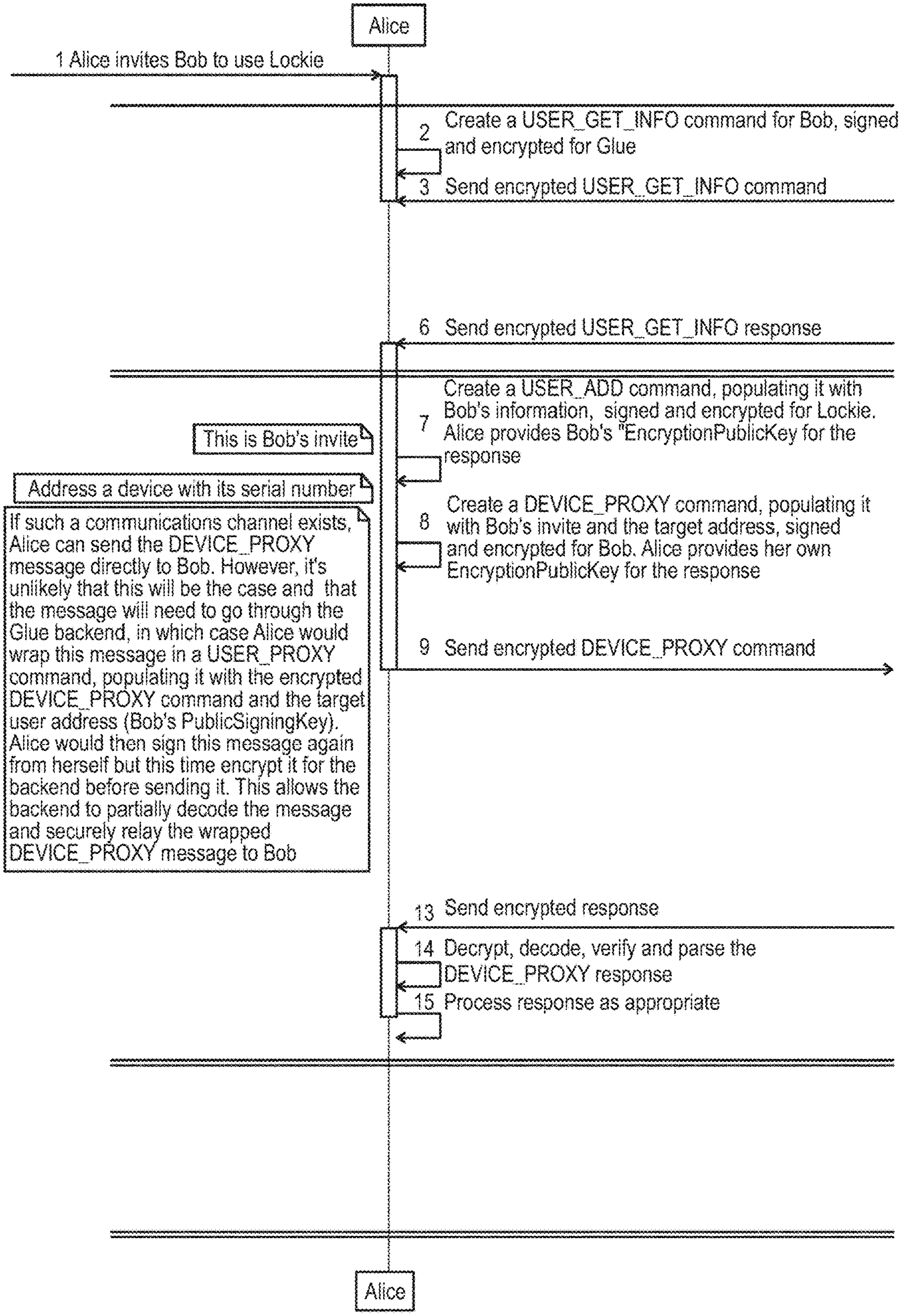
FIGS. 3A-3C together show a sequence diagram of a further method for securely delivering messages to the device of FIG. 1.
Figure 3B:
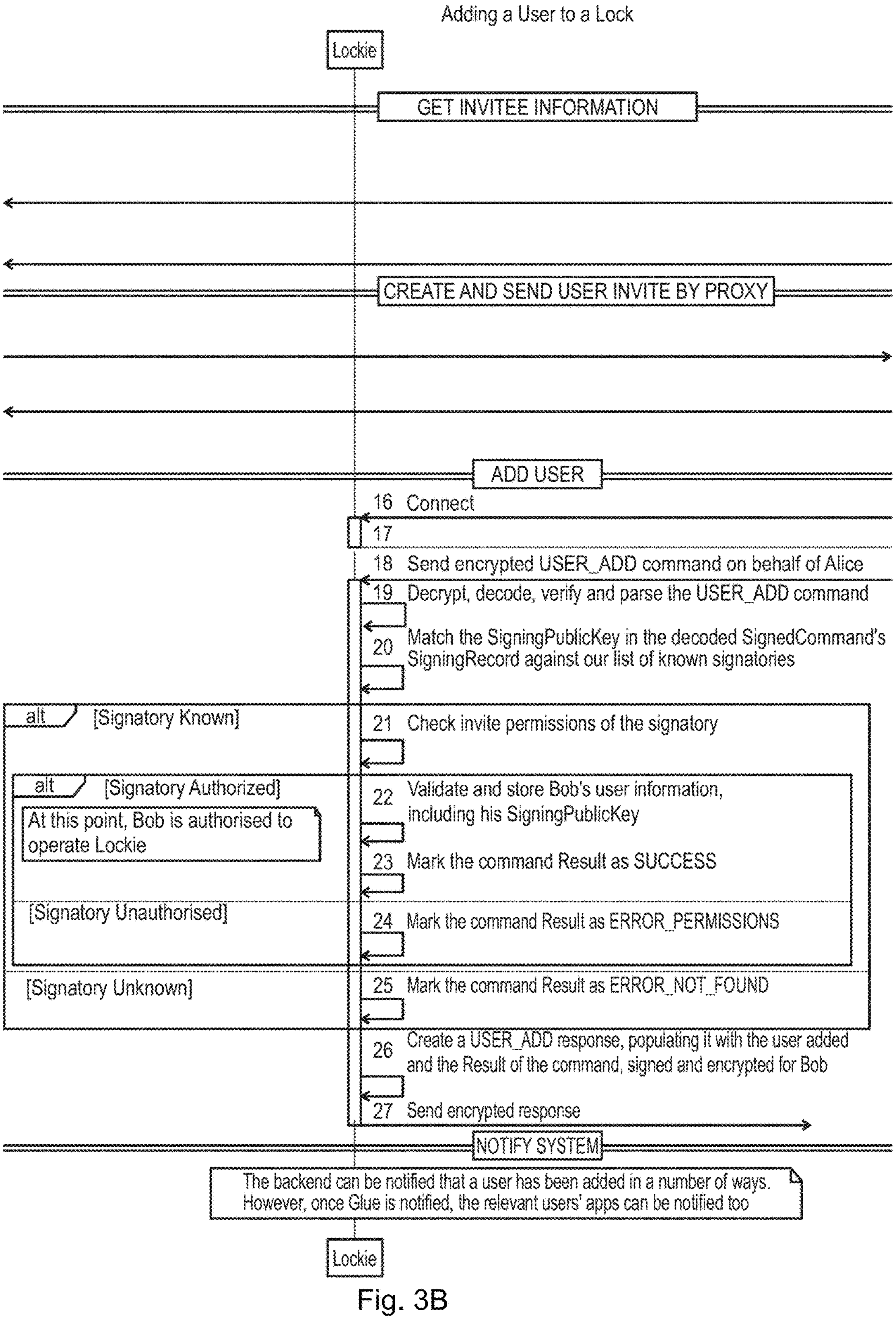
Figure 3C:
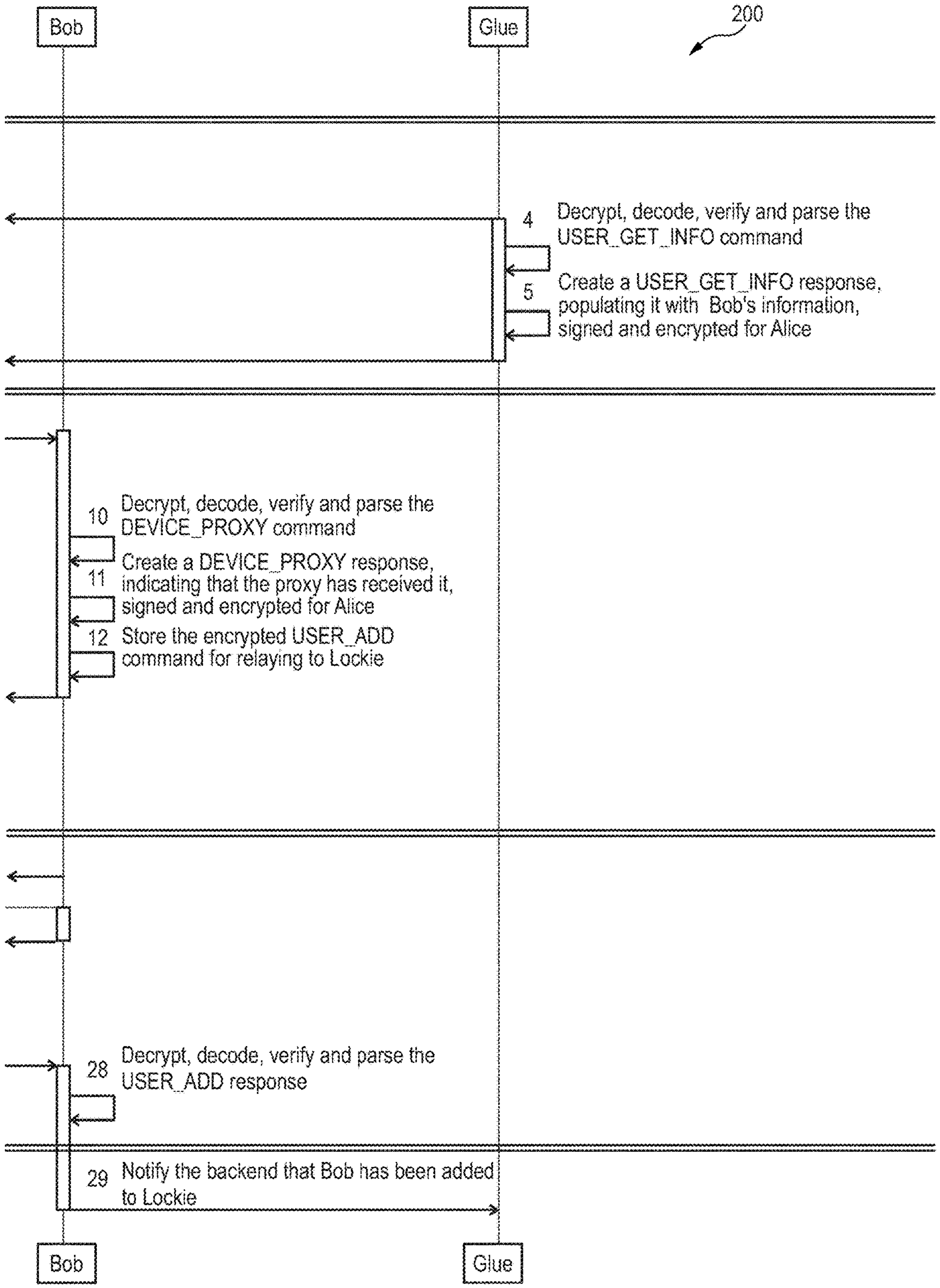

As well as showing Alice (trusted user 20), Bob (untrusted user 30), and Lockie (device 40), FIGS. 3A-3C add a further trusted entity, server or platform, "Glue" 50. There may be a single server 50 acting or managing many trusted and untrusted entities as well as devices 40. In the example process 200 shown in FIGS. 3A-3C, Alice initiates the request to add Bob to the list of trusted entities stored on Lockie. This is done by Alice providing user information to Glue 50 in a form that is signed by Alice and encrypted using Glue's public encryption key. Glue 50 responds (if accepting Alice's digital signature) with Bob's public details for Alice to accept. In this scenario, Bob has previously been registered with the Glue platform 50 and his public details are known to it.

Alice generates a USER_ADD command with Bob's information and signs and encrypts this for Lockie. Alice wraps this object in a DEVICE_PROXY command that contains the address of Lockie signed and encrypted for Bob (i.e., for Bob to read). The resultant object or token is sent to Bob who decrypts the outer wrapper of the token using their own private key resulting in the DEVICE_PROXY command. Bob acknowledges receipt to Alice. Bob can store the information (accessible DEVICE_PROXY command and inaccessible USER_ADD command) for later user or can use this immediately.

Bob then sends the USER_ADD command (in encrypted form) to Lockie. This is checked and authenticated by Lockie, who actions the command (in this case to add Bob as a trusted user). A response may be sent to Bob (success, failure, errors, etc.). Bob can also send an optional notification to the Glue server 50, informing the system that Bob has been added as a new trusted entity with certain specified permissions.

It is not necessary that a new user or entity is added to the device 40 as a new trusted user in order for commands or messages to be accepted by the device 40. Typically, sharing access rights with a third-party (e.g., so that a delivery or unlocking command can be sent and accepted) can require certain trade-offs between security and usability. The present system 10 and method 200 provide such usability without degrading security.

Preferably, third party access (e.g., to fulfil a delivery) to a device 40 (e.g., a lock) may be provided in accordance with:

1. Any third-party access to a lock must be explicitly granted by a user of that lock that has sufficient permissions.
2. Third-party access is possible preferably through short-lived commands issued by the user to an untrusted user (e.g., a delivery driver).
3. Each third-party access key or token is valid only for the duration of a specific delivery.
4. The server or platform (e.g., Glue) may handle a third-party's request for access on behalf of the delivery driver and the third-party company.
5. For Glue to issue an access to a third-party, they must be pre-trusted by Glue.
6. A third-party access may be provided for a specific combination of device (lock) and user (delivery driver), such that if it is compromised it cannot be used to operate any other lock.
7. A user may revoke Glue's authorisation to request third-party accesses at any time.

Access to a property (e.g., by unlocking and locking a smart lock in order to make a delivery of a package) may be provided by the system 10 and method 200 issuing commands, as described previously. Such message and commands may be provided to the device 40 (or any device in the system 10) using similar proxy messages to those described above in the example of user invitations. For example, a delivery driver may be provided with a PARTNER_ACCESS_TOKEN by proxy, which is a one-time operation token that has been signed by the customer (trusted user 20) for access to their device 40 (e.g., lock). By using this token, the delivery driver does not need to be added as a user to the device (lock) in order to gain access to a location secured by the lock. However, the one-time access may be secured by an authorised lock user. Therefore, the PARTNER_ACCESS_TOKEN may be configured to have a validity period or range, an expiry date and/or a unique identifier (e.g., digital signature of the trusted entity 20) that can only be used once and then rejected if an identical token is presented.

In summary, the message is encrypted for the intended recipient such that only they can read it, and it is signed by the sender so that the recipient can know exactly who sent it and therefore whether they can trust the message itself and take any necessary action. In order for the message to be relayed safely by a third party (trusted or otherwise), it is wrapped inside a proxy message, then encrypted and signed for the third party. The third party may then use any metadata (e.g., location information such as an address, postcode, GPS coordinates, serial number, etc.) in the proxy message to relay the original message to its intended recipient. Even if the third party was malicious, they cannot read the contents of the original message, but they can pass on the message securely. The proxy or additional message from the untrusted user may contain other information not limited to location information. For example, it may describe conditions for delivery (e.g., a time window), compensation or reward for making the delivery, or other information.

Figure 4:
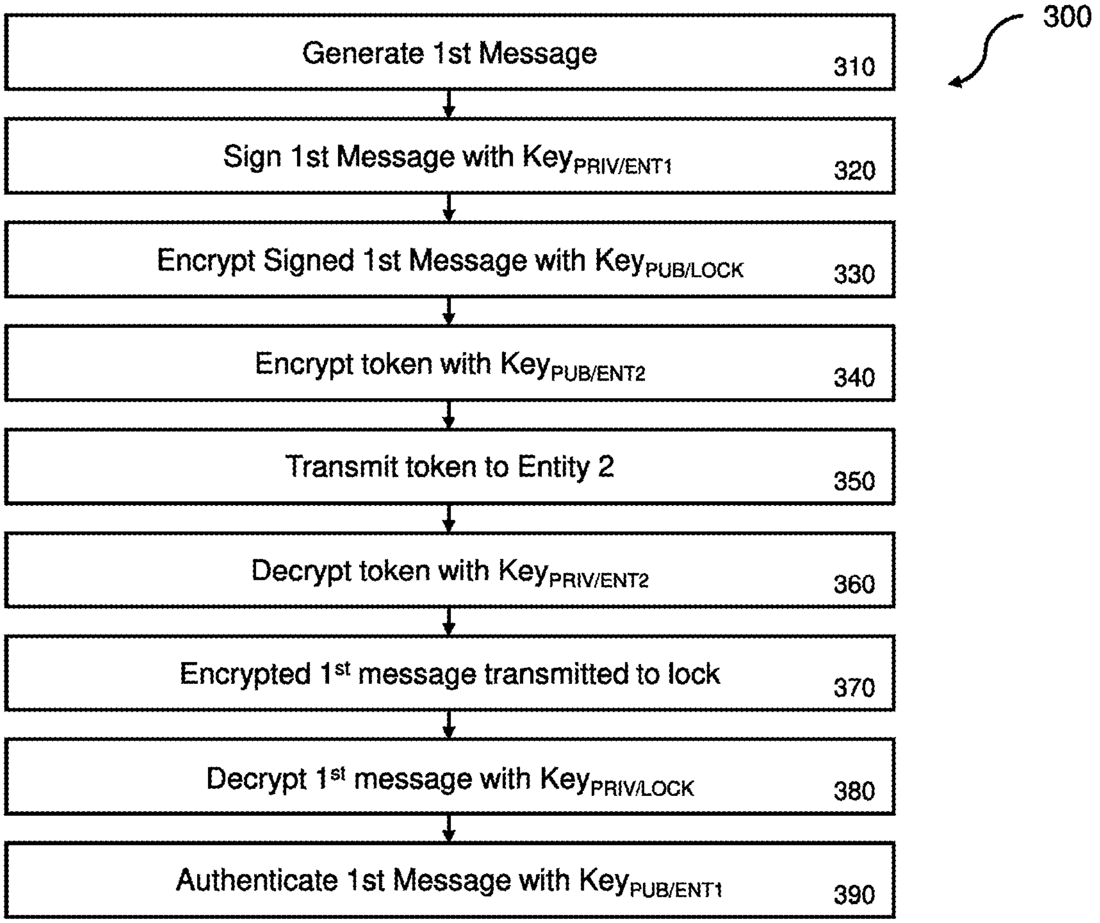
FIG. 4 shows a flow chart of a method for securely delivering messages to the device of FIG. 1.

FIG. 4 shows a flowchart of a method 300 for operating the system 10 described with regards to FIG. 1. In this flowchart, the trusted user 20 is described as a first entity (ENT1), the untrusted or other user 30 is described as a second entity (ENT2), the signing keys of ENT1 are $Key_{PRIV/ENT1}$ and $Key_{PUB/ENT1}$, the encryption keys of the ENT2 are $Key_{PRIV/ENT2}$ and $Key_{PUB/ENT2}$, and the encryption keys of the device (lock) are $Key_{PRIV/LOCK}$ and $Key_{PUB/LOCK}$.

At step 310 a first message is generated. This may be an unlock command or an add new user command, for example. The message may be generated following further steps not described in this Figure (e.g., informing the server or platform of the message details). The first message is signed by ENT1 at step 320 using $Key_{PRIV/ENT1}$. This may be achieved by adding a digital signature to the first message (e.g., using hashing and/or cryptographic functions involving the $Key_{PRIV/ENT1}$).

At step 330, the resultant signed first message is encrypted using $Key_{PUB/LOCK}$ so only the device (lock) 40 can recover the signed first message. At step 340 a further encryption is applied using $Key_{PUB/ENT2}$ or wrapped onto the data object to form a token. This token is transmitted to the second entity at step 350. The second entity can partially unwrap or decrypt the token using their $Key_{PRIV/ENT2}$ at step 360. However, the second entity cannot recover the signed first message as this was encrypted by the lock's public key and so requires $Key_{PRIV/LOCK}$ to decrypt and read.

The second entity transmits the encrypted (and signed) first message to the lock at step 370. The lock can decrypt the encrypted (and signed) first message using its $Key_{PRIV/LOCK}$ at step 380 and then authenticate the signed first message using the public key of the first entity, $Key_{PUB/ENT1}$, which it previously stored. The device (lock) can interpret and act on the message, which may contain a command, whilst being sure that the message hasn't been tampered with and originated at a trusted user or entity (ENT1).

Figure 5:
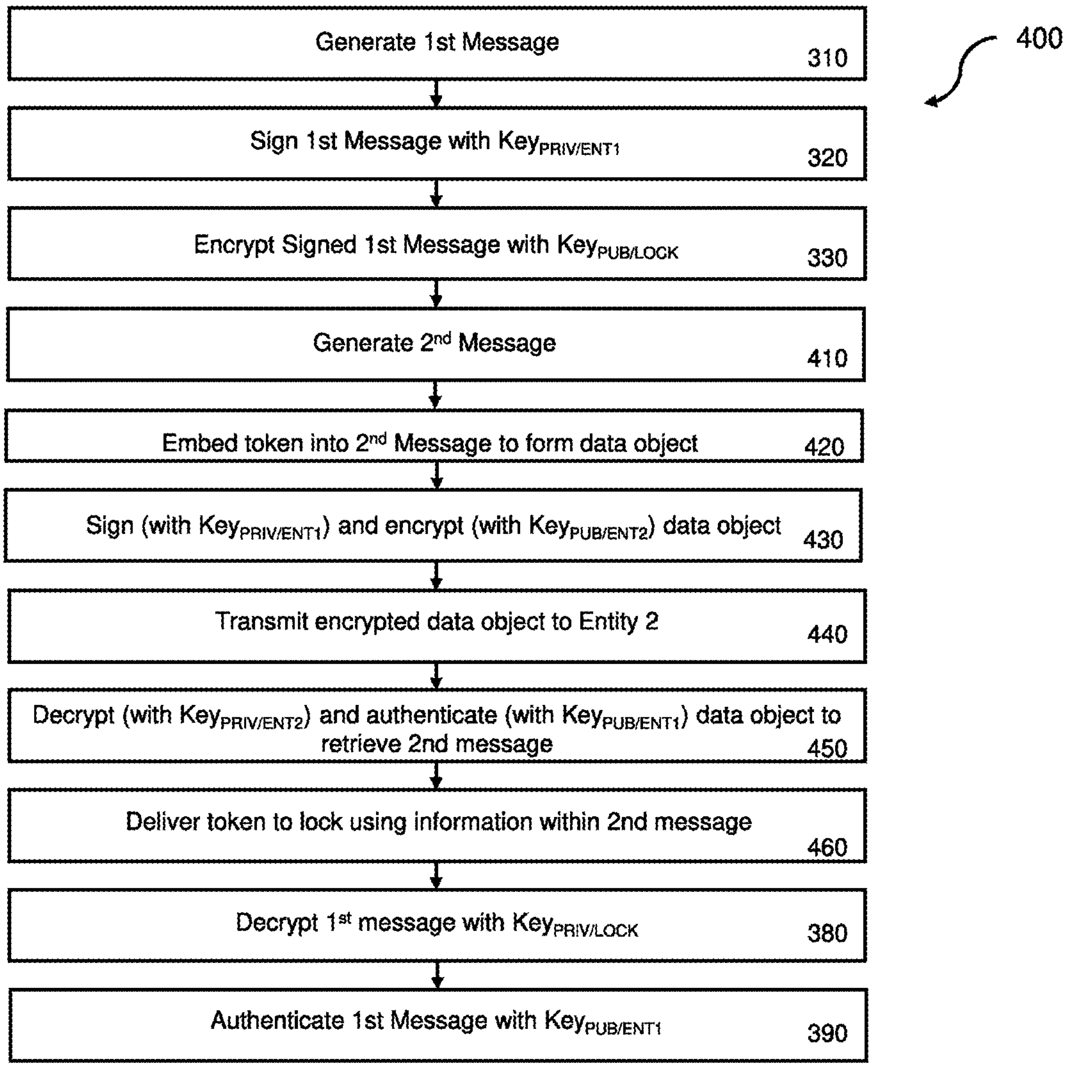
FIG. 5 shows a flow chart of a further method for securely delivering messages to the device of FIG. 1, given by way of example only.

FIG. 5 shows a further flowchart of an enhanced method 400. This enhanced method 400 is based on method 300 described with reference to the FIG. 4. Similar method steps have been provided with the same reference numerals. However, this enhanced method 400 includes an additional second message that is generated at step 410 (this can be done at different stages of the method 400 but shown in FIG. 5 occurring after step 330).

The token is embedded into the second message at step 420. The token and second message may be combined in different ways to form a data object. For example, the second message may be embedded into the token, or a simple concatenation may be used.

At step 430 of FIG. 5, the data object is signed using $Key_{PRIV/ENT1}$ and encrypted using $Key_{PUB/ENT2}$. The token, at this step of method 400, is within the data object (a combination of the token and the second message). Therefore, the first (signed) and encrypted message (the token) is wrapped inside the second message (or vice versa) and encrypted to form an encrypted data object. The signed and encrypted data object is transmitted to the second entity at step 440. The second entity (ENT2) authenticates (using $Key_{PUB/ENT1}$) and decrypt the data object (using $Key_{PRIV/ENT2}$) to retrieve the second message and the token (but not the first message) at step 450.

The second message contains information to enable the second entity to deliver the token to the device (lock). For example, the second message may be location information. At step 460, the second entity uses this information to deliver the token to the lock (provided that authentication is successful). The lock then proceeds to decrypt and authenticate the first message (and act on any contained commands) in a similar way to that described with reference to FIG. 4.

Third-Party Access (TPA) may be used to enable safer deliveries or other temporary and secure access to devices (e.g., electronic locks) by third parties. Sharing access rights with a third-party (which is conceptually what a delivery is) generally requires a balance between security and usability or convenience. Increasing security can result in reduced user convenience. The following list indicates general requirements for such a system:

1. Any third-party access to an electronic lock or other device should be explicitly granted by a user or owner of that lock or device (a first entity) that has sufficient client permissions.
2. Third-party access should be possible only through short-lived commands issued by the third party (e.g., the delivery driver, courier, or other entity).
3. Each third-party access key or token is valid only for the duration of a specific delivery.
4. The system or platform (denoted as "Glue" in the following examples) may handle a third-party's request for access on behalf of the delivery driver and any associated third-party company. Glue may also be described as a third entity.
5. For Glue to issue or provide access to a third-party, they should be pre-trusted by Glue.
6. Third-party access may be provided for a specific combination of lock (or other device) and delivery driver, such that if it is compromised it cannot be used to operate any other lock or device.
7. A user may revoke Glue's authorisation to request third-party accesses at any time.
8. Third parties should not be fully trusted to comply with all requirements and so Glue (or the platform) should have control over how third parties integrate into the Glue ecosystem.

Access to a device (e.g., a delivery to a property secured by an electronic lock) may be fulfilled by making use of the proxy messages provided for user invitations (e.g., adding users). In summary, a delivery driver (second entity) is provided with a PARTNER_ACCESS_TOKEN (e.g., an example first message) by proxy, which is a one-time operation token that has been signed by the customer (first entity) for access to their lock (or other device). By using this token, the delivery driver (second entity) does not need to be added as a user to the lock in order to gain access, but their one-time access is secured by an authorised lock user or owner (first entity).

Figure 6:
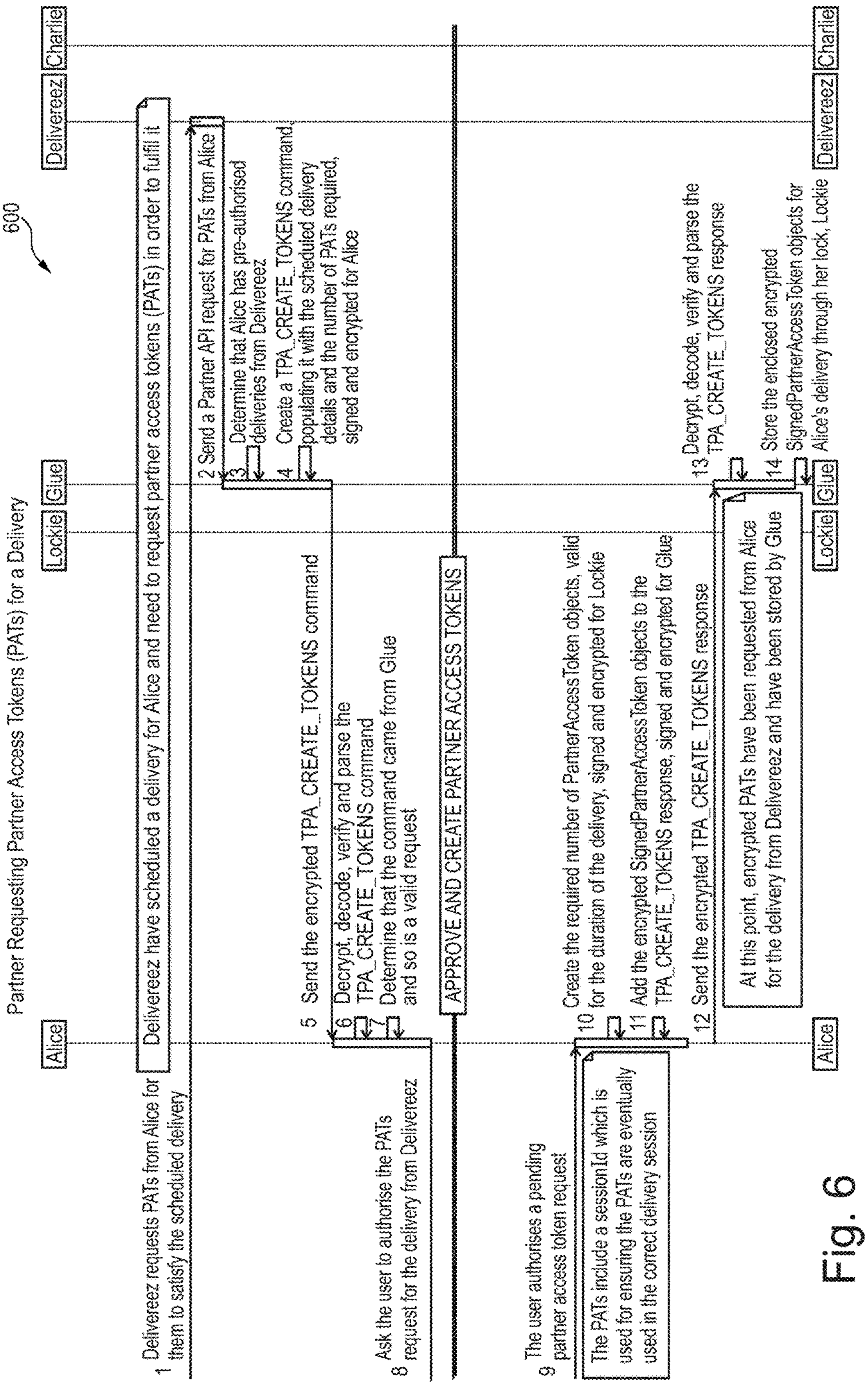
FIG. 6 shows a sequence diagram of a further method for securely delivering messages to the device of FIG. 1.
Figure 7A:
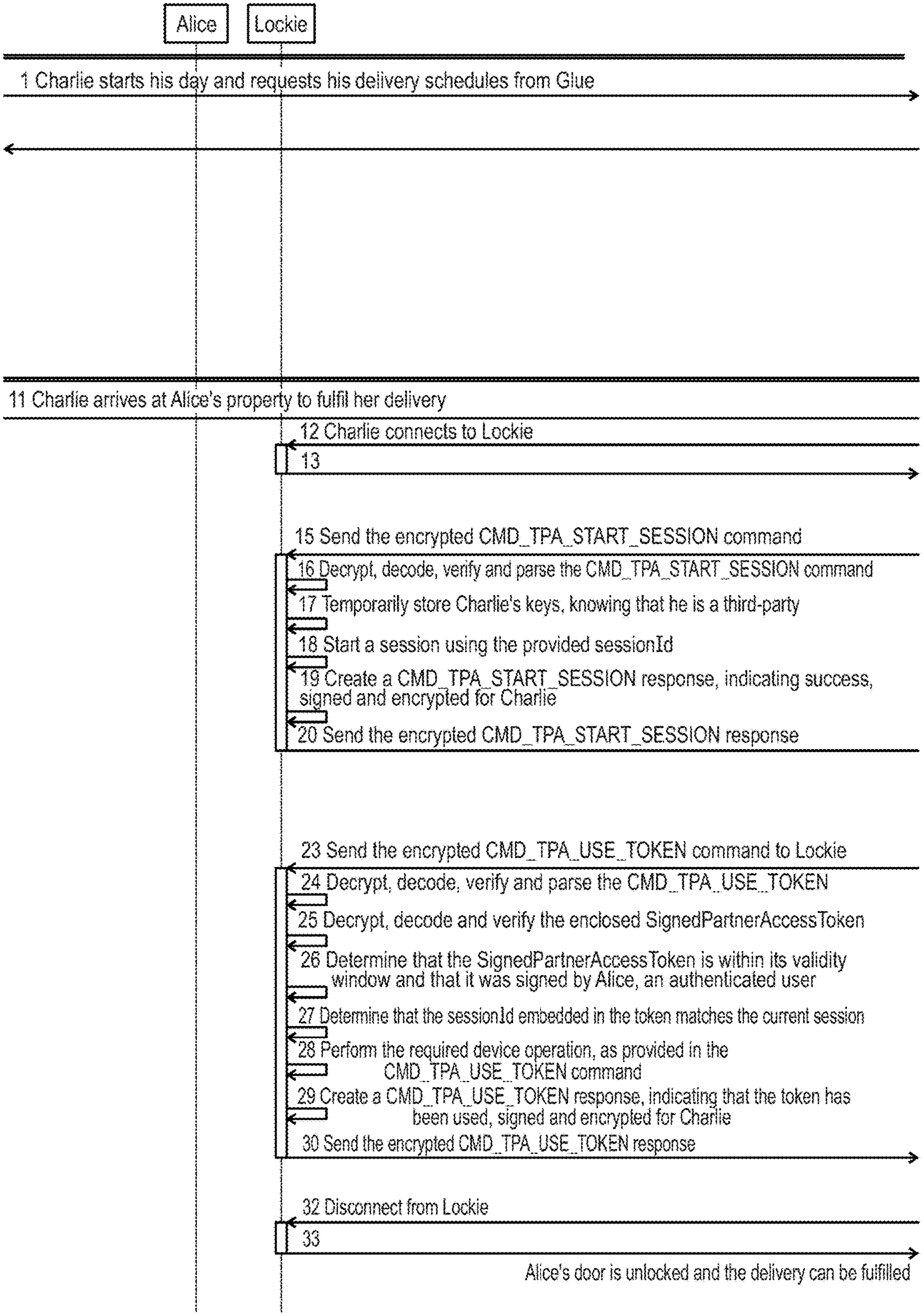
FIGS. 7A-7C together show a sequence diagram of a further method for securely delivering messages to the device of FIG. 1.
Figure 7B:
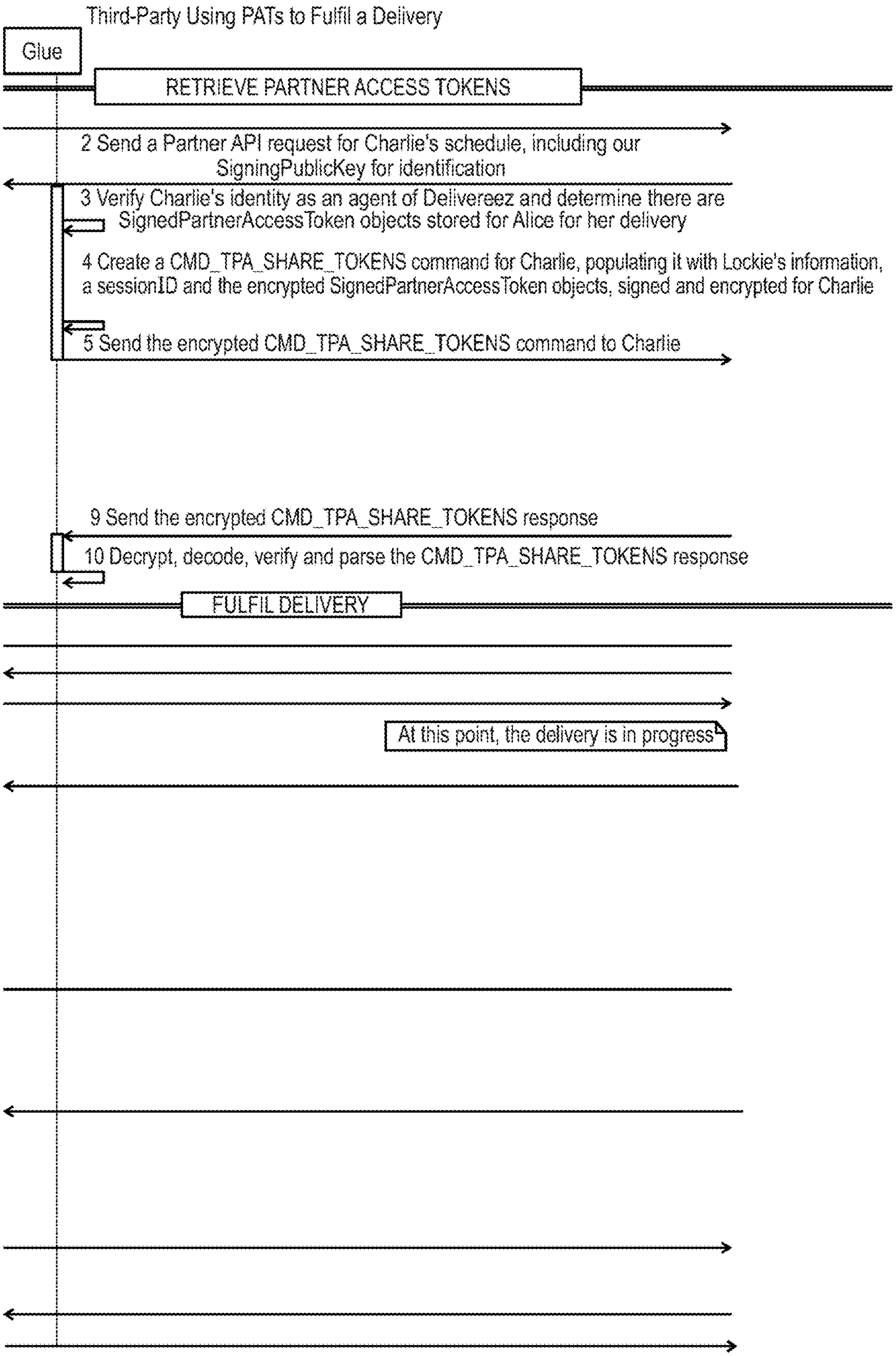
Figure 7C:
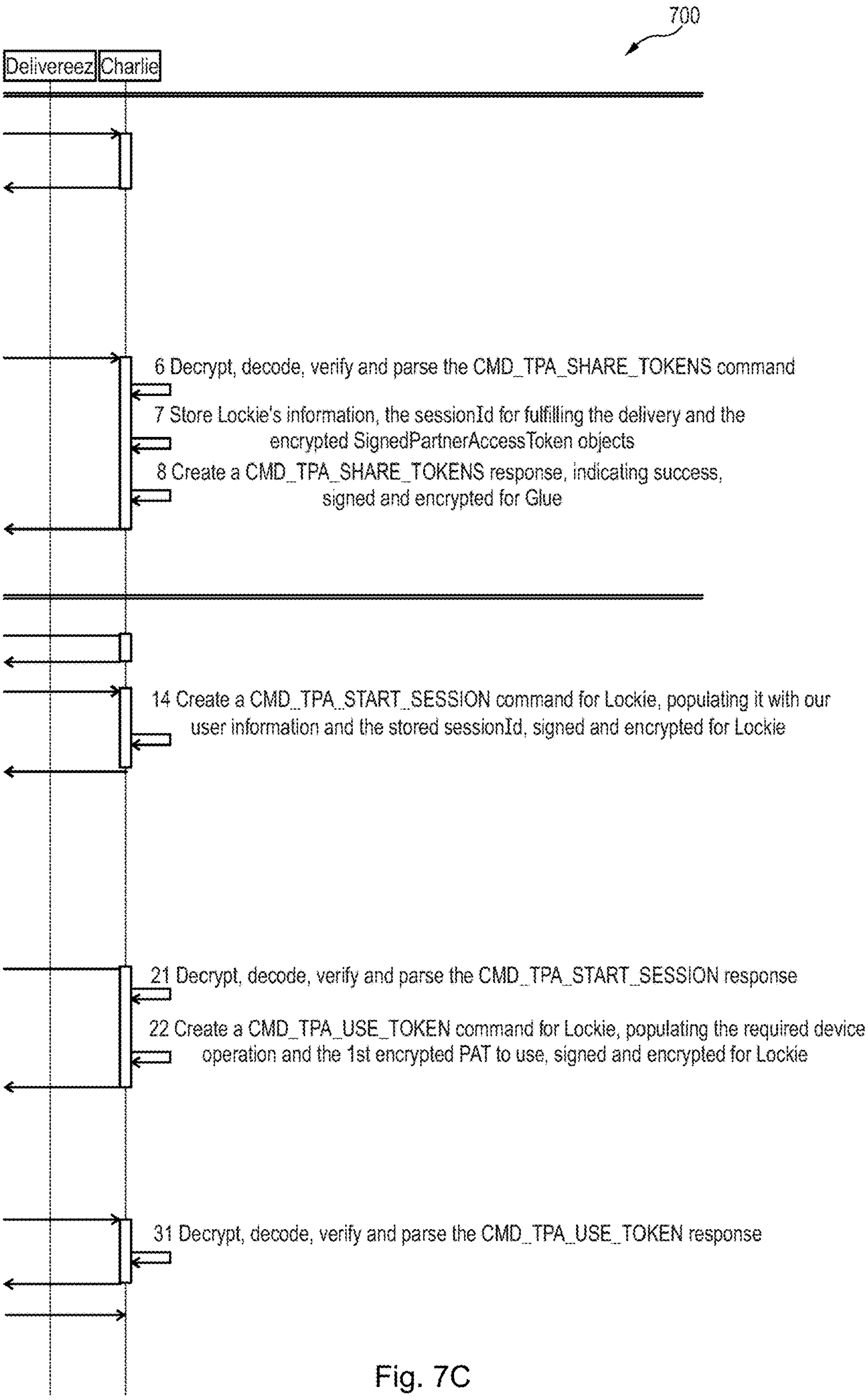
Figure 8A:
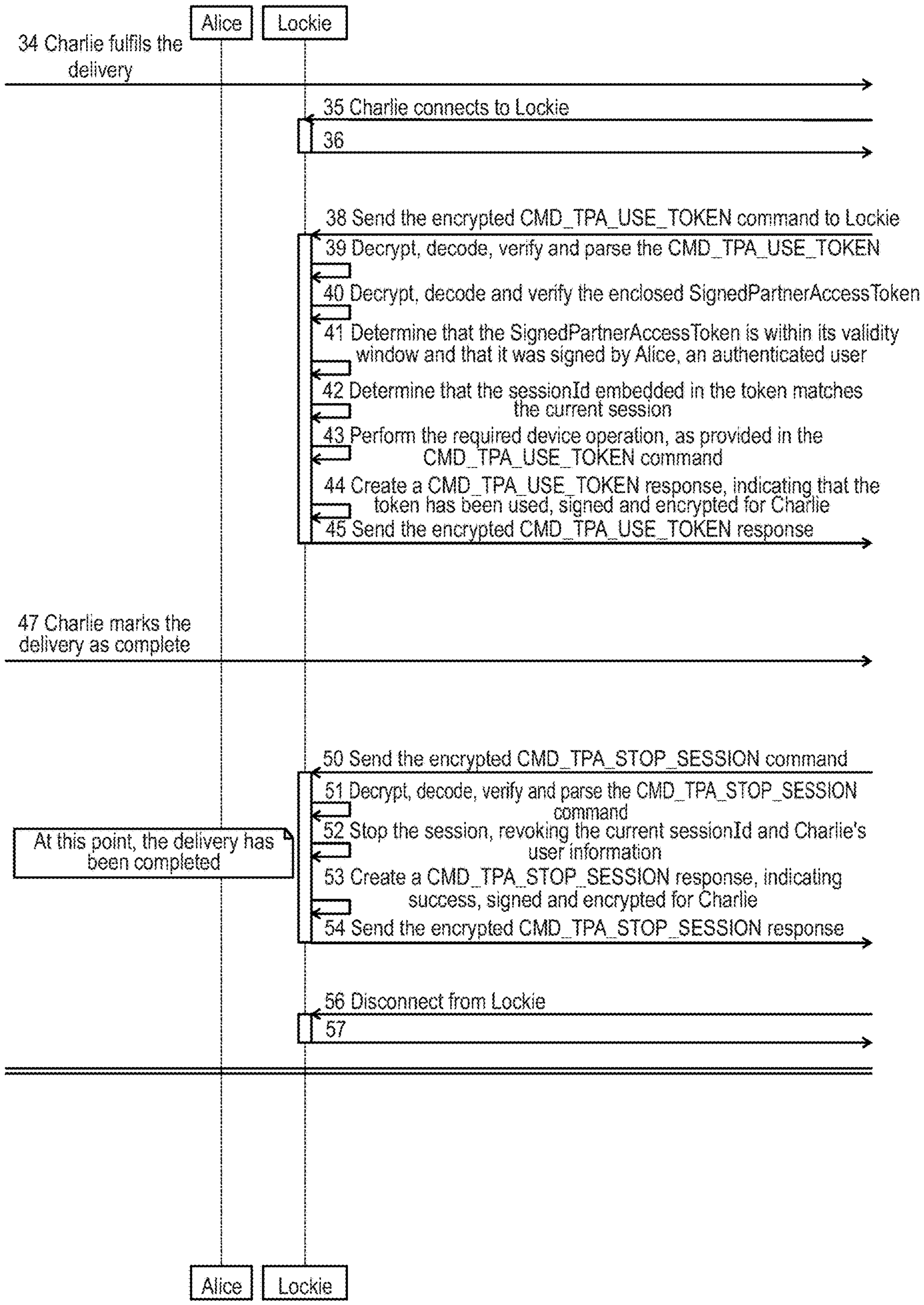
FIGS. 8A-8B together show a sequence diagram of a further method for securely delivering messages to the device of FIG. 1.
Figure 8B:
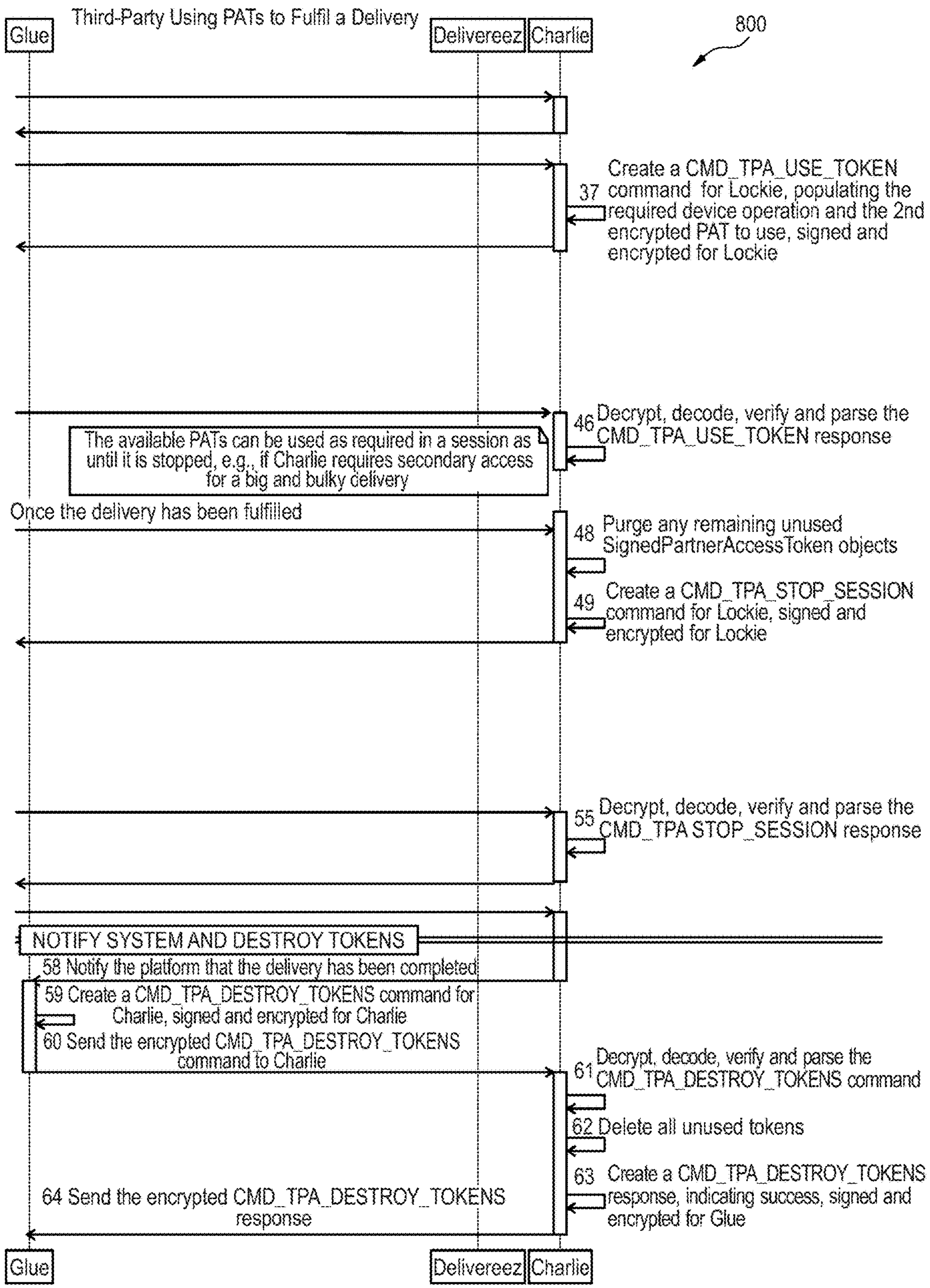

TPA Sessions & Partner Access Tokens (PATs) are now described. The following description focusses on the phases of a delivery that includes enhancements to previous concepts and steps, where a partner requests Partner Access Tokens for a delivery from a user and where a third party (second entity) uses the PATs to fulfil the delivery. These stages in the process are shown in FIG. 6 as a sequence diagram 600 illustrating the interactions and requests between the user or owner of the device (shown as "Alice"—first entity) in the sequence diagram 600, the device (shown as "Lockie" in the sequence diagram 600), the platform (shown as "Glue"—third entity, in the sequence diagram 600), a third party or a delivery courier (shown as "Charlie"—second entity in the sequence diagram 600), and a further entity which is a controller or employer of Charlie (shown as "Delivereez" in the sequence diagram 600). The same entities are shown in the subsequent sequence diagrams of FIGS. 7A-7C and 8A-8B.

Note that the other delivery phases, e.g., the onboarding of third parties, are omitted from these figures for simplicity.

The following summarises the processes shown in sequence diagrams 600, 700 and 800:

1. The PATs are created and signed by the user (Alice) that the delivery is for and at the behest of the partner (Delivereez or a supervising entity of the second entity). The PATs are encrypted for the target lock (Lockie) and so cannot be viewed by any intermediary, including Glue.
2. The PATs are embedded with session IDs on creation that allow the lock to verify that PATs are eventually used for the delivery or other event that they were created for. This is in addition to (or instead of) the PATs having a validity window embedded within them so they can only be used during the user-approved delivery time window.
3. The PATs are essentially delivered by proxy (e.g., by the delivery courier, Charlie) within a CMD_TPA_USE_TOKEN command. Each PAT allows one operation. The use token command may accompany a transmission of the PAT to the device from the second entity.
4. The session ID is used to start a session within the lock for the delivery, which is verified against the session ID embedded in each token (first message). Once a session is started, any number of (valid) PATs may be used to authenticate operations whilst the session is active. This is useful because it allows deliveries of big and bulky items that require multiple trips into the property. Therefore, several PATs may be used within a particular session until it is closed.

5. Multiple sessions may be active in the lock or device at any given time, meaning multiple deliveries can take place simultaneously.

Therefore, the third party (second entity) can create their own commands for the device (e.g., electronic lock). For example, these may be simple commands such as lock and unlock or more complex commands such as add or remove a user or send a message. However, these commands may only be executed by the device if they are accompanied by a valid PAT and within a session initiated with a session ID validated against the session ID embedded in that PAT.

As will be appreciated by the skilled person, details of the above embodiment may be varied without departing from the scope of the present invention, as defined by the appended claims.

For example, whilst only a single trusted user, a single untrusted user and a single device is shown in the figures, the system may comprise any number of such users and devices.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for delivering a secure message to a device, comprising:
- generating a first message to deliver to the device;
- digitally signing the first message using a private key of a first entity, wherein the private key has a corresponding public key;
- encrypting the digitally signed first message using a public key of the device to form a token, wherein the public key of the device has a corresponding private key;
- further encrypting the token using a public key of a second entity, wherein the public key of the second entity has a corresponding private key;
- transmitting the further encrypted token to the second entity;
- the second entity decrypting the further encrypted token using the private key of the second entity to recover the token;
- the second entity delivering the token to the device;
- the device decrypting the token to recover the digitally signed first message using the private key of the device; and
- the device authenticating the digitally signed first message using the public key of the first entity.

2. The method of claim 1 further comprising:
- generating a second message;
- embedding the encrypted digitally signed first message into the second message to form a data object;
- signing the data object with the private key of the first entity,
- wherein further encrypting the token using the public key of the second entity further comprises signing the data object with the private key of the first entity and encrypting the resultant signed data object using the public key of the second entity to form an encrypted signed data object,
- wherein the second entity decrypting the encrypted token further comprises the second entity decrypting the encrypted signed data object using the private key of the second entity to recover the signed data object; and
- the second entity authenticating the signed data object using the public key of the first entity, wherein the second entity delivers the token to the device using information contained within the second message,
- wherein the information contained within the second message is data locating or identifying the device.

3. The method of claim 2 further comprising digitally signing the second message using a private key of a trusted entity before adding the second message to the encrypted digitally signed first message to form the token, wherein the second entity authenticates the digital signature used to digitally sign the second message using the public key of the trusted entity, wherein the trusted entity is the first entity, an entity with the same authorisation permissions as the first entity, or an external server.

4. The method of claim 1, wherein the second entity delivers the encrypted digitally signed first message to the device using a local wireless communication protocol, wherein the local wireless communication protocol is Bluetooth Low Energy, BLE, Thread, Zigbee, or near field communication, NFC.

5. The method of claim 1, wherein the device receives and stores the public key of the first entity before receiving the encrypted digitally signed first message.

6. The method of claim 1, wherein:
- the first message contains an instruction for the device to operate, unlock, or lock,
- the method of further comprises the device unlocking or locking in response to the first message,
- each first message is uniquely identifiable and the device requires receiving a first message that has not been previously used to unlock the device, before executing each unlocking action, and
- the instruction to the device to unlock has an expiry time and/or a validity time window.

7. The method of claim 1, wherein the first message contains an instruction to:
- register a new entity within memory storage within the device;
- remove a stored entity from the memory storage within the device; and/or
- temporarily register a new entity within the device for a limited time period, and
- wherein registering a new entity comprises sharing between the new entity and the device public keys of the new entity and the device.

8. The method of claim 1, wherein the device is an electronic lock.

9. The method of claim 1, wherein in response to a request issued by a third entity transmitted to the first entity, the first entity carries out:
- generating the first message to deliver to the device;
- digitally signing the first message using the private key of the first entity;
- encrypting the digitally signed first message using the public key of the device to form the token;
- transmitting the token to the third entity, and
- wherein the third entity carries out further encrypting the token using the public key of a second entity,
- wherein the further encrypted token is transmitted to the second entity by the third entity;
- wherein the second entity transmits to the third entity an indication that the token has been delivered to the device; and
- wherein the third entity deletes the token in response to receiving the indication that the token has been delivered to the device.

10. The of claim 9, wherein:

the second entity delivering the token to the device further comprises the second entity issuing an instruction to the device to use the first message to execute a command, wherein the command is executed by the device following the device authenticating the digitally signed first message, the request issued by the third entity to the first entity includes data describing a validity time period for the first message, the validity time period is included in the first message and further wherein device executes the command if the current time is within the validity time period included in the first message, the device executes the command after determining that the first message has not been previously used to execute a command, the request includes a session identifier, the session identifier is included in the first message, the second entity delivering the token to the device further includes the second entity issuing an instruction to the device to start a session corresponding to the session identifier included in the first message, and the method further comprises the second entity issuing an instruction to the device to end the session after the command has been executed.

11. The method of claim 10 further comprising:

the device executing the command after determining that the session identifier has not been used before and/or the session has not ended; and the second entity transmitting a confirmation after the session has ended.

12. The method of claim 11 further comprising:

the third entity instructing the second entity to delete the token in response to receiving the confirmation that the session has ended; and the second entity deleting the token in response.

13. A system comprising:

a device;

a second entity;

a first entity comprising at least one processor adapted to execute:

generating a first message to deliver to the device, digitally signing the first message using a private key of the first entity, wherein the private key has a corresponding public key, encrypting the digitally signed first message using a public key of the device, wherein the public key of the device has a corresponding private key to form a token, further encrypting the token using a public key of the second entity, wherein the public key of the second entity has a corresponding private key, and transmitting the delivery token to the second entity, wherein the second entity comprises at least one processor adapted to execute:

decrypting the further encrypted token using the private key of the second entity to recover the token, and delivering the encrypted digitally signed first message to the device, and further wherein the device comprises at least one processor adapted to execute:

decrypting the first message using the private key of the device, and the device authenticating the first message using the public key of the first entity.

14. The system of claim 13, further comprising a server comprising at least one processor adapted to execute:

receiving from the first entity a request to register the second entity, the request comprising identification information of the second entity;

digitally signing the identification information of the second entity;

encrypting the digitally signed identification information using the public key of the first entity;

transmitting the digitally signed and encrypted identification information to the first entity; and receiving a response confirming the registration of the second entity.

15. The system of claim 14, wherein the response is received from the device, from the first entity, and/or from the second entity.

16. The system of claim 14, wherein the at least one processor of the first entity is further adapted to execute:

generating a second message;

embedding the token into the second message to form a data object; and signing the data object using the private key of the first entity, wherein further encrypting the token using the public key of the second entity further comprises signing the data object with the private key of the first entity and encrypting the resultant signed data object using the public key of the second entity to form an encrypted data object, wherein the second entity decrypts the encrypted signed data object using the private key of the second entity to recover the signed data object, and further wherein the at least one processor of the second entity is further adapted to execute:

authenticating the signed data object using the public key of the first entity, wherein the second entity delivers the token to the device using information contained within the second message, and wherein the information contained within the second message is data locating the device.

17. The system of claim 16 wherein the at least one processor of the server is further adapted to execute:

digitally signing the second message using a private key of the server before the second message is added to the encrypted digitally signed first message to form the token, wherein the second entity authenticates the digital signature used to digitally sign the second message using the public key of the server, and wherein the device is an electronic lock.

18. The system of claim 13 further comprising a third entity comprising at least one processor adapted to execute:

transmitting a request from the third entity to the first entity, wherein the at least one processor of the first entity is further adapted to execute:

in response to the request issued by the third entity to the first entity:

generating the first message to deliver to the device;

digitally signing the first message using the private key of the first entity;

encrypting the digitally signed first message using the public key of the device to form the token;

transmitting the token to the third entity, and wherein the at least one processor of the third entity is adapted to carry out further encrypting the token using the public key of the second entity, wherein the further encrypted token is transmitted to the second entity by the third entity;

wherein the second entity transmits to the third entity an indication that the token has been delivered to the device; and wherein the third entity deletes the token in response to receiving the indication that the token has been delivered to the device.

19. A device comprising:

a local wireless communication interface;

memory storing a public key and a corresponding private key of the device, and a public key of a first entity; and at least one processor adapted to execute:

receiving from a second entity over the local wireless communication interface an encrypted token containing a first message, wherein the first message contains an instruction;

decrypting the first message using the stored private key of the device;

authenticating the first message using the public key of the first entity; and following successful authentication, carrying out the instruction.

20. The device of claim 19, wherein the device is an electronic lock and further wherein the instruction comprises an unlocking or locking instruction and carrying out the instruction unlocks or locks the electronic lock, wherein the instruction comprises:

registering a new entity within memory of the device;

removing a stored entity from the memory within the device; and/or temporarily registering a new entity within memory within the device for a limited time period.

* * * * *